Patented Apr. 1, 1930

1,752,916

UNITED STATES PATENT OFFICE

WILLI LUDWIG, OF HOCHST-ON-THE-MAIN, AND OTTO SCHAUMANN, OF WIESBADEN, GERMANY, ASSIGNORS TO WINTHROP CHEMICAL COMPANY INC., OF NEW YORK, N. Y., A CORPORATION

SOLUTIONS OF THE ACTIVE PRINCIPLE FROM ANIMAL ORGANS AND THE PROCESS OF PREPARING THE SAME

No Drawing. Application filed October 6, 1927, Serial No. 224,516, and in Germany October 15, 1926.

Our present invention relates to solutions, free from or poor in cholesterin, of the active principle of the ovary and other glands with internal secretion.

The investigations into the nature of the active principle of the placenta and the ovary have hitherto been carried out in two directions:

In view of the fact that efficacious extracts can be prepared which, on the one hand, are of a lipoid character and, on the other hand, appear to be water-soluble to a certain extent, a number of investigators consider the lipoid character of the active product of secretion of the said glands to be essential (see Faust, Schweizer Medizinische Wochenschrift 1925 No. 25; Dodds und Dickens, Biochemical Journal, 1925, 19 page 853; Hartmann, Bio. 175, 47), whereas other authors (see Laqueur, Deutsche med. Wochenschrift 1926, 1 und 2; Zondek, Klinische Wochenschrift 1926, No. 27) regard the active product of secretion as being soluble in water and attribute its lipoid properties to ballast substances which are still present therein. According to the above mentioned two views 2 kinds of solutions of the secretion of the ovary have been utilized, namely an oily solution and an aqueous solution. The former possesses the advantage of greater efficacy but it cannot be sufficiently well endured by the patient (see Zondek, Klinische Wochenschrift 1926, No. 27 page 1219); on the contrary the aqueous solution is well endured but its efficacy is very limited. Moreover, no proof has been furnished hitherto that the aqueous extracts constitute true solutions, because commercial products of this kind become turbid when mixed with water (see Zondek, Kl. W. 1926, No. 33, 1521).

For the above stated reasons there is a demand for an ovarian preparation in which the higher efficacy of the hitherto used oil-soluble preparations is united with the property which the aqueous preparation possesses of being well endurable.

Now we have found that a product possessing the advantages of both the aqueous and the oil-soluble preparations can be obtained by using as solvent water soluble nitrogen-free oxygen derivatives of polyvalent alcohols, that is to say ethers or esters. Owing to their solubility in water and their power of dissolving the lipoids, the said solvents permit the preparation of extracts containing a high percentage of the active principle.

The use of the solvents in question involves, moreover the following important advantage. According to our experiments, when treating the crude extract, obtained after saponification of the fats and the cholesterol ester, with the said solvents while adding thereto a certain quantity of water, almost all of the cholesterin which is insoluble in these solvents is separated and can be easily removed by filtration. In this manner it is possible to prepare solutions of the active principle in any desired concentration which can be well endured by the patient and which may be further diluted with water to any degree without there being caused any precipitation or turbidity of the solution.

We have finally found that the above described process is not limited to the preparation of the active principle of the substances obtained from the ovary substance, but that also, when using other organs for instance heart or liver or glands with internal secretion, as starting material the water-soluble ethers and esters of polyvalent alcohols may be successfully employed as agents for separating the cholesterol or other ballast substances and for dissolving the active substance; thus there may, for instance, be used male germ-glands and the anterior lobe of the hypophysis.

The following examples serve to illustrate our invention, but they are not intended to limit it thereto:

1. The alkaline crude extract from the ovaries of cattle obtained in the usual manner by saponification of the fats and cholesterol ester of the ovaries, is taken up in water and extracted with ether. The ethereal extract, after being dried, is concentrated and the residual mass is taken up with 40–60 ccm. of diethyline of the following formula:

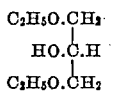

per kilo of the ovaries. After the addition of 30–50 ccm. of water (according to the quantity of cholesterol contained in the extract) all of the cholesterol precipitates in a pure chystalline form and is then filtered at 0° C. The resulting filtrate contains the active principle in a pure state and may be used in any desired form and concentration.

Instead of diethyline there may be used in the present example 1.3-glycerindimethyl-ether.

2. The crude extract, obtained in the manner indicated in Example 1 by saponification of the fats and the cholesterol-ester, is mixed with water and extracted with ether. The residual mass left after expelling the ether, is dissolved in 30 ccm. of diacetine per kilo of the ovary. On adding about 20–25 ccm. of water, the cholesterol is precipitated and filtered by suction at ice temperature. The filtrate may be standardized to any percentage of the active substance.

3. 1 kg. of the anterior lobe of the hypophysis or of a male germ-gland is extracted in the usual manner by means of an organic solvent and the crude concentrated mass is taken up in ether. The resulting solution is then freed from the ether by evaporation, the residue dissolved in diethyline and from this solution the ballast-substances contained therein are eliminated by fractional precipitation with water. The liquids obtained after filtration contain the active principle in a purified state and they may be concentrated to any extent.

In the following claims the term "organs" is to be understood to comprise both internal organs, such as the heart, liver, etc., and glands with internal secretion, and the term "nitrogen-free oxygen-derivatives of a polyvalent alcohol" to comprise those polyvalent alcohols in which one or several of the hydroxyl-hydrogen atoms is replaced by an alkyl-group or acyl-group, that is to say the corresponding ethers or esters.

We claim:

1. The process for preparing very efficacious and well-endurable solutions of the active principle from animal organs, which consists in treating the respective crude extracts, obtained in the usual manner, with a water-soluble nitrogen-free oxygen derivative of a polyvalent alcohol and fractionally precipitating from the extract so prepared the ballast-substances by means of water.

2. The process of preparing efficacious and well endurable solutions of the active principle from animal organs, which process consists in treating the respective crude extracts obtained in the usual manner with diethyline and fractionally precipitating from the extract so prepared the ballast substances by means of water.

3. The process of preparing efficacious and well-endurable solutions of the active principle from ovaries, which consists in treating the respective crude extracts, obtained in the usual manner with a water-soluble nitrogen-free oxygen derivative of a polyvalent alcohol and fractionally precipitating from the extract so prepared the ballast-substances by means of water.

4. The process of preparing efficacious and well-endurable solutions of the active principle from ovaries, which consists in treating the respective crude extracts obtained in the usual manner with diethyline and fractionally precipitating from the extract so prepared the ballast substances by means of water.

5. As new products, solutions containing the active principle from animal organs dissolved in a water-soluble, nitrogen-free oxygen derivative of a polyvalent alcohol and water, being free from any ballast substances, and capable of being diluted to any extent with water without showing any precipitation, said products possessing a very high efficacy and the property of being well endurable.

6. As new products, solutions of the active principle from animal organs in diethyline and water being free from any ballast-substances and capable of being diluted to any extent with water without showing any precipitation, said products possessing a very high efficacy and the property of being well endurable.

7. As new products, solutions of the active principle from ovaries in diethyline, being free from any ballast substances and capable of being diluted to any extent with water without showing any precipitation, said products possessing a very high efficacy and the property of being well endurable.

In testimony whereof, we affix our signatures.

WILLI LUDWIG.
OTTO SCHAUMANN.